(12) United States Patent
Gillespie, Jr. et al.

(10) Patent No.: US 6,575,626 B1
(45) Date of Patent: Jun. 10, 2003

(54) HUNTER'S GEAR BAG

(76) Inventors: Louis J. Gillespie, Jr., P.O. Box 445, Haynes, AR (US) 72341; William E. Eddings, Jr., 121 Barton Cove, Marion, AR (US) 72364

( * ) Notice: Subject to any disclaimer, the term of this patent is extended or adjusted under 35 U.S.C. 154(b) by 0 days.

(21) Appl. No.: 10/032,347

(22) Filed: Dec. 31, 2001

(51) Int. Cl.[7] .............................................. B65D 33/02
(52) U.S. Cl. ....................................... 383/34.1; 383/12
(58) Field of Search .......................... 383/12, 34, 34.1; 220/9.2; 248/99, 100

(56) References Cited

U.S. PATENT DOCUMENTS

| | | | | |
|---|---|---|---|---|
| 134,357 A | * | 12/1872 | Butterfield et al. | 190/121 |
| 459,864 A | * | 9/1891 | Boyle | 383/16 |
| 518,574 A | * | 4/1894 | Procter | 383/34 |
| 624,677 A | * | 5/1899 | Pawling | 383/23 |
| 1,887,940 A | * | 11/1932 | Marinsky | 383/43 |
| 2,015,473 A | * | 9/1935 | Hankel | 24/30.5 R |
| 3,260,488 A | * | 7/1966 | Kliewer et al. | 248/99 |
| 3,653,619 A | * | 4/1972 | Plum | 248/99 |

* cited by examiner

Primary Examiner—Jes F. Pascua
(74) Attorney, Agent, or Firm—John J. Mulrooney

(57) ABSTRACT

A hunter's gear bag provides a collapsible, foldable container capable of removable attachment to hunting tree stands for the convenient storage of hunting gear, food and other equipment and items useful to hunters during time spent in a tree stand awaiting prey. A bag is constructed from panels of fabric to form a pocket having a top opening for the insertion and removal of items. The bag is attached at its top opening to a frame that has pivoting members which rotate between a collapsed position when the bag is closed to a expanded position when the bag is open. One of the frame members is capable of releasable attachment to the hunter's stand. The gear bag is foldable to form an unobtrusive attachment to the hunter's stand while the stand is transported to or from the place of use and during deployment in a tree. The panels of fabric used to construct the pocket may be water-resistant and/or camouflage fabric.

13 Claims, 4 Drawing Sheets

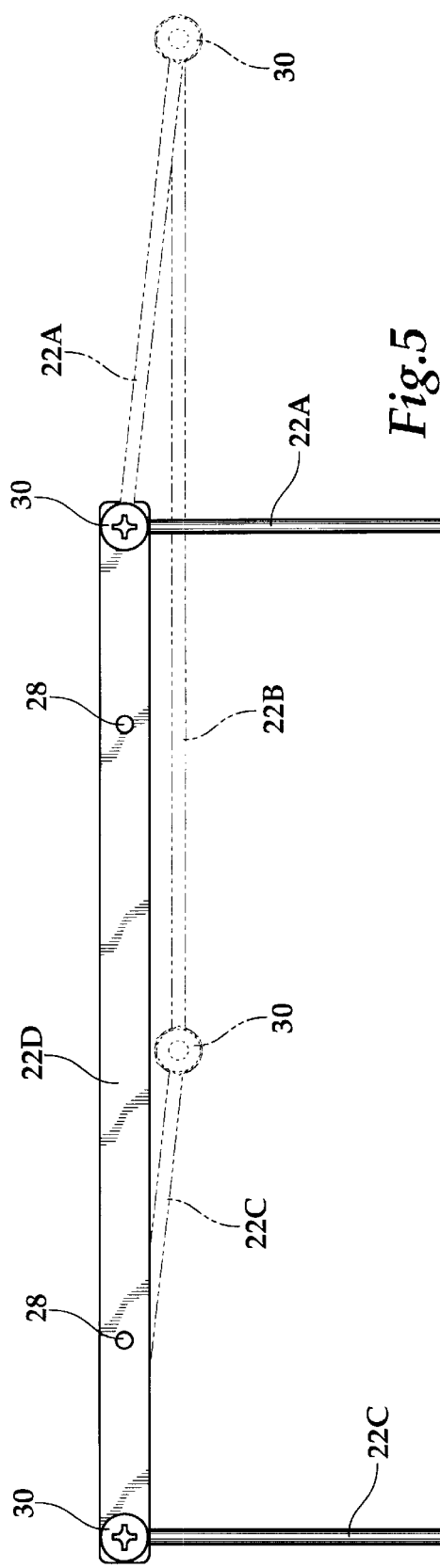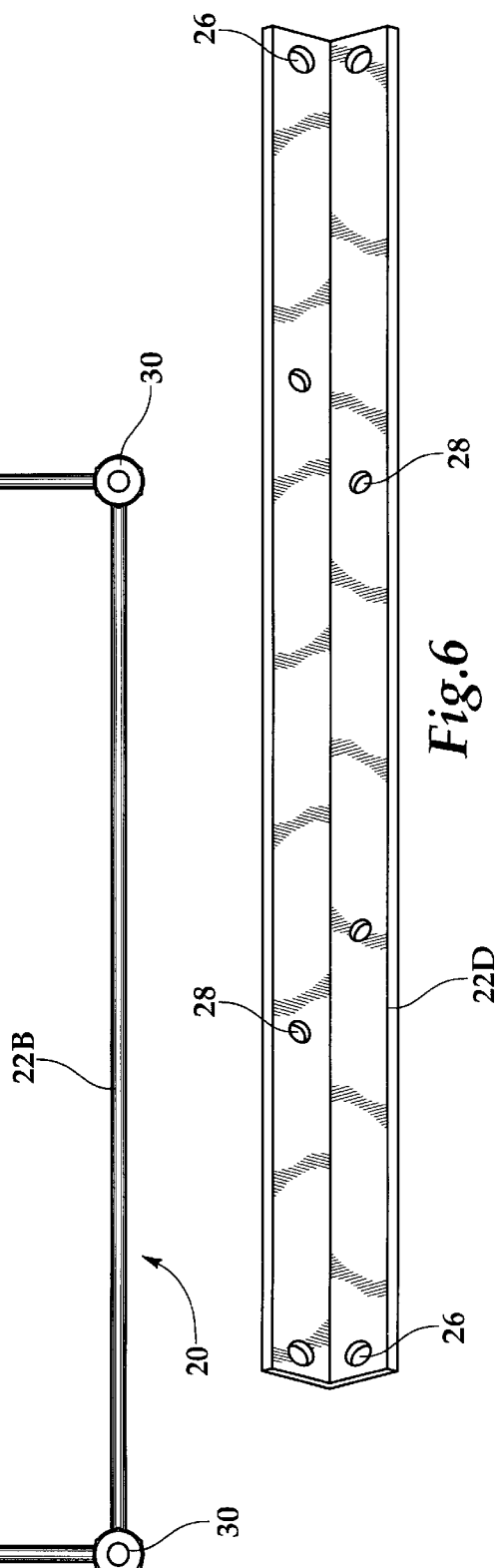

HUNTER'S GEAR BAG

BACKGROUND OF THE INVENTION

1. Field of the Invention

The present invention relates generally to containers for sports gear, paraphernalia and other items carried by sportsmen and outdoor enthusiasts. In particular, the present invention relates to a collapsible, foldable bag that is capable of removable attachment to a hunting tree stand, boat, hunting blind, vehicle, or lawn furniture for storing gear, equipment and supplies used by sportsmen and outdoor enthusiasts.

2. Information Disclosure Statement

Hunting tree stands are well known in the art and have met with widespread acceptance by hunters. The stand is mounted in a tree at an elevation above the ground to enable a hunter to be seated while awaiting the prey to appear below. Tree stands may be permanently mounted in a tree or may be portable for temporary mounting and removal after each use. Typically, a portable tree stand comprises frame members that provide a platform for a seat and frame members that connect the platform to the tree. Ordinarily, these frame members are collapsible to allow the hunter's tree stand to be folded into a compact configuration for transportation.

Even though portable hunting tree stands have met with widespread acceptance among hunters, such portable stands have an inherent disadvantage in that such stands do not provide the hunter with a convenient and practical means for storing sporting gear such as ammunition, paraphernalia such as binoculars, supplies such as food, and such other desirable items as are usually carried by hunters when anticipating spending several hours in a tree stand.

A preliminary patentability search produced the following patents, which may be relevant to the present invention: Hughes et al., U.S. Pat. No. 4,274,508, issued Jun. 23, 1981; Bass, U.S. Pat. No. 5,165,500, issued Nov. 24, 1992; and Lindamann, U.S. Pat. No. 6,205,935, issued Mar. 27, 2001. However, none of the known prior patents teach the use of a sportsman's gear bag having the features, construction and utility of the present invention. None of the known prior references, either singly or in combination, disclose or suggest the present invention.

It is therefore desirable to provide a sportsman's gear bag that is capable of removable attachment to a hunter's tree stand for providing a convenient and practical container for storing sporting equipment such as ammunition and other equipment such a binoculars and supplies such as food that hunter's need or find desirable when in a hunting tree stand.

BRIEF SUMMARY OF THE INVENTION

A hunter's gear bag provides a collapsible, foldable container capable of removable attachment to hunting tree stands for the convenient storage of hunting gear, food and other equipment and items useful to hunters in a tree stand awaiting prey. The container comprises a bag constructed of panels of fabric sewn together to form a pocket having a top opening for the insertion and removal of items. The bag is attached at its top opening to a frame that has pivoting members which rotate between a collapsed position when the bag is closed to a expanded position when the bag is open. One of the frame members is capable of releasable attachment to the hunter's stand. The gear bag is foldable to form an unobtrusive attachment to the hunter's stand while the stand is transported or during deployment in or removal from a tree.

It is therefore an object of the present invention to provide a container for storing equipment and other items carried by sportsmen and outdoor enthusiasts.

It is another object of the present invention to provide a sportsman's gear bag that may be removably attached to a hunting tree stand, boat, hunting blind, vehicle, or lawn furniture.

It is an another object of the present invention to provide a sportsman's gear bag that may be easily and quietly opened and closed by pivoting a frame that supports the bag.

It is an another object of the present invention to provide a sportsman's gear bag that is collapsible and foldable, whereby the bag may be left attached to a hunter's tree stand during transportation of the stand.

BRIEF DESCRIPTION OF THE DRAWINGS

FIG. 5 is a top plan view of the bag frame showing, in solid lines, the frame in the open condition and showing, in dotted lines, the frame in a collapsed condition.

FIG. 6 is an angle mounting bracket which is an alternative to the flat mounting bracket identified by reference 22D in the drawings.

DETAILED DESCRIPTION OF THE INVENTION

Figure 1:
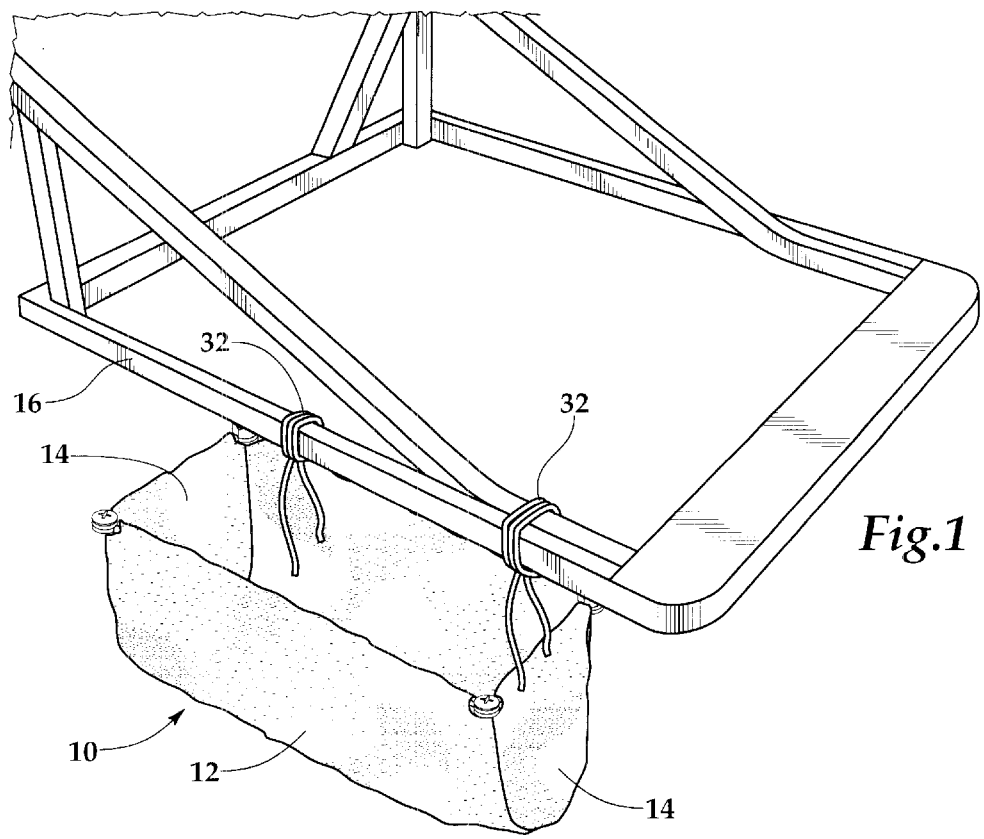
FIG. 1 is a perspective view of the gear bag of the present invention mounted on a hunter's tree stand in an open condition.

Referring to the drawings, a gear bag indicated generally by 10 is constructed according to the present invention and mounted on a hunter's tree stand 16. The gear bag comprises a center panel 12 and end panels 14 that are sewn together to provide a pocket-type container. The top edges of the panels 12 and 14 are folded over and sewn to the panels at 18A, 18B, 18C, and 18D to form sleeves 19A, 19B, 19C, and 19D for receiving the members of a bag frame as described below. Different sizes and capacities for the bag 10 are possible by varying the dimensions of the panels 12 and 14 and the frame. The panels 12 and 14 are made of a lightweight fabric having a color and characteristics selected in connection with the intended use of the bag. For example, the fabric for panels 12 and 14 used to construct a gear bag for use in a hunter's stand or blind, may consist of a lightweight water-resistant fabric bearing a camouflage pattern to better obtain the objects of the invention. Gear bags constructed for use on boats or with lawn furniture might incorporate fabric panels 12 and 14 that are color coordinated with the color of the boat or lawn furniture.

Figure 4:
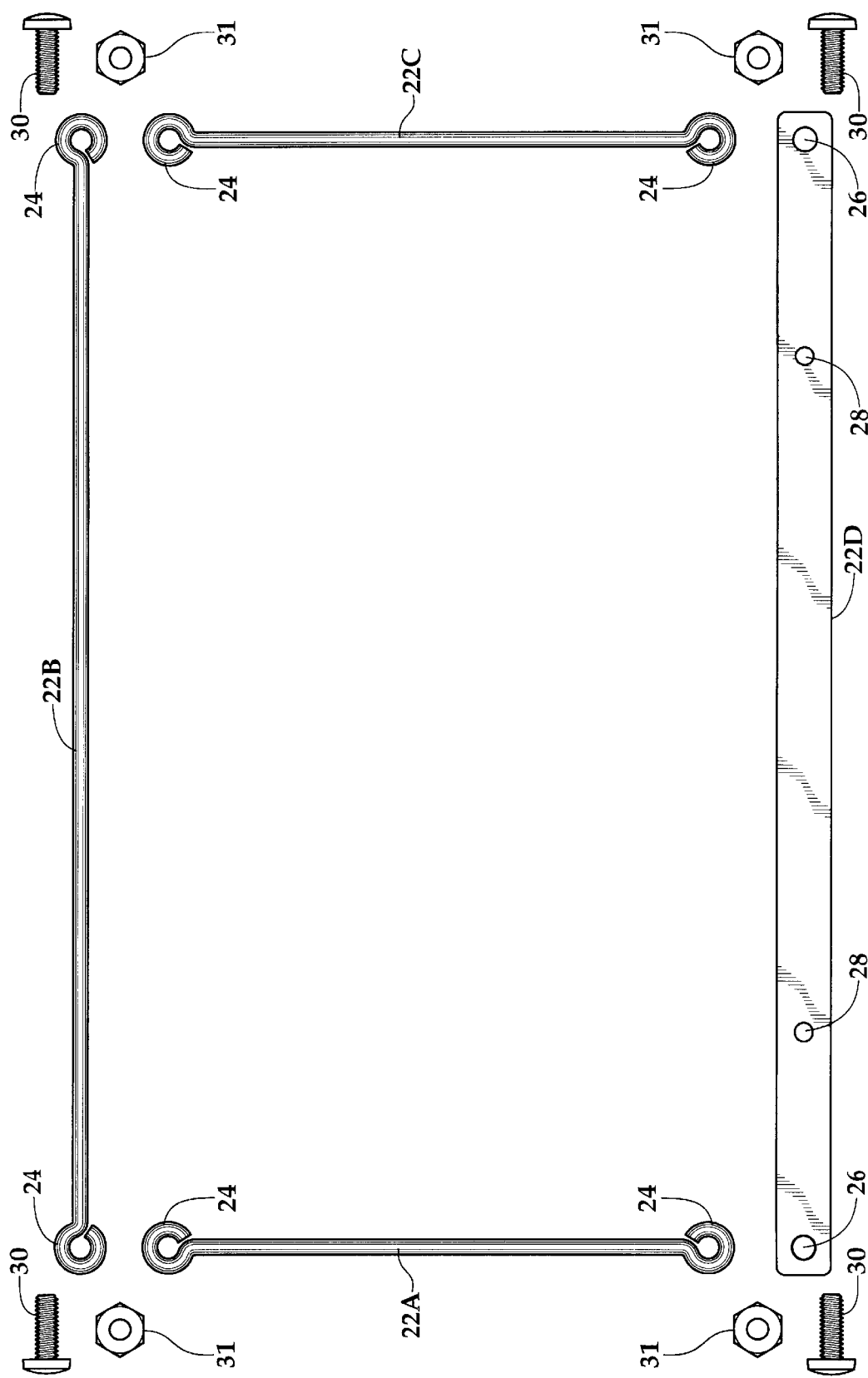
FIG. 4 is an exploded view of the bag frame illustrated in FIG. 5.

Referring to FIGS. 4 and 5, a frame indicated generally by the numeral 20 consists of members 22A, 22B, 22C, and 22D. Frame members 22A, 22B, and 22C are made of spring steel wire and have mounting loops 24 at each end thereof. Frame member 22D is a flat aluminum bracket with holes 26 at each end thereof for attachment to frame members 22A and 22C, and a plurality of mounting holes 28 along the length thereof to permit the bag 10 to be removably attached to a hunter's tree stand or boat or other object. Frame members 22A, 22B, 22C and 22D are pivotally connected at their ends by fastening means 30 and 31 whereby the frame 20 is foldable or collapsible as illustrated by the dotted lines in FIG. 5. The spring steel wire construction of frame members 22A, 22B, and 22C provides a flexible feature to the frame that will help prevent breakage during the rugged handling to which the sportsman's gear bag 10 will be subjected. As shown in FIG. 5, the frame 20 is pivotable from an expanded rectangular shape when the sportsman's gear bag is open to a collapsed condition illustrated by the dotted lines when the gear bag is closed. FIG. 6 illustrates an angle bracket 22D which is an alternative mounting bracket to the flat bracket 22D shown in FIG. 4. The angle bracket is interchangeable with the flat bracket in the frame 20. The use of either the flat mounting bracket 22D or the angle mounting bracket 23D is determined by the available surface to which the sportsman's gear bag will be attached.

Figure 2:
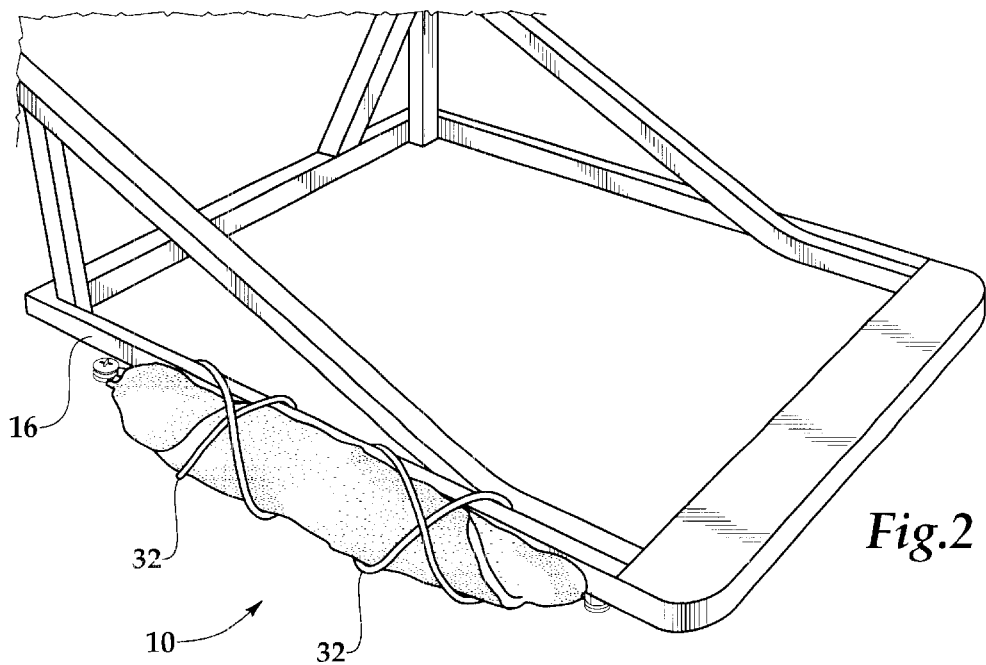
FIG. 2 is a perspective view of the gear bag of the present invention mounted on a hunter's tree stand in an closed and folded condition.
Figure 3:
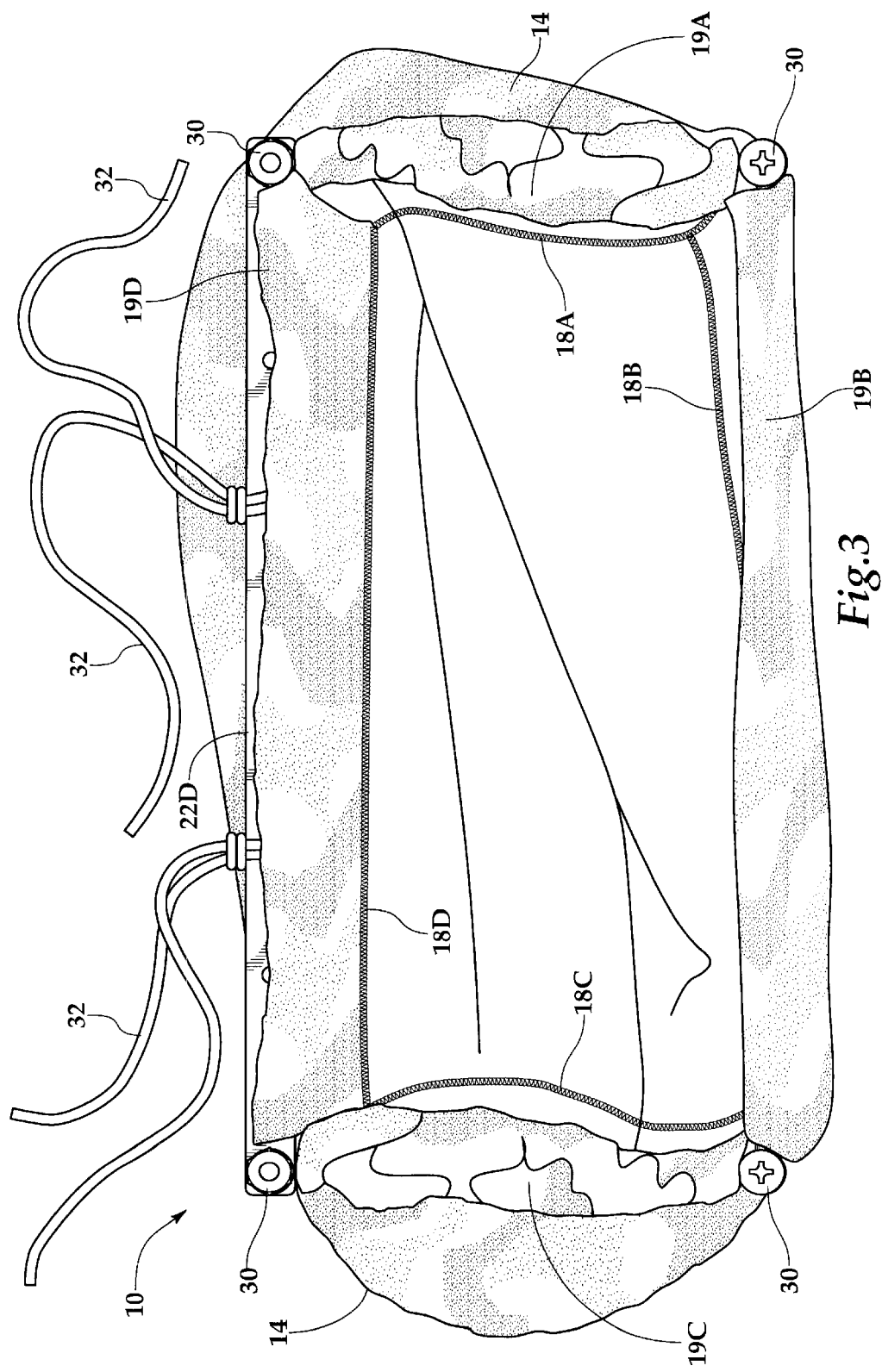
FIG. 3 is a top plan view of the gear bag of the present invention.

The bag 10 is mounted on the frame 20 by inserting frame members 22A, 22B and 22C into sleeves 19A, 19B and 19C, respectively, and attaching the ends of frame members 22A–D together. In the embodiment illustrated, frame member 22D is not inserted through sleeve 19D, to allow for maximum flexibility and prevent binding of the bag fabric when the frame is pivoted between the open and closed positions. Tie strings 32 are sewn to the sleeve 19D and encircle frame member 22D to provide a means to secure the bag to the hunter's stand in a folded and unobtrusive condition as shown in FIG. 2 when the stand is transported.

In use, the collapsible and foldable feature of the hunter's gear bag 10 allows the bag to be secured to a hunting tree stand 16 before the stand is transported to the location where the stand will be placed in a tree. The gear bag may be attached to the stand 16 either by the use of bolts (not shown) in connection with the mounting holes 28 in the bracket 22D. When the gear bag is attached to the stand and deployed in its closed and folded condition, it does not interfere with the transportation or convenient storage of the hunter's stand. When attached to a stand, the bag provides a useful storage compartment within convenient reach of the hunter for storing hunting gear, or food, or any of the many items that hunters find necessary or useful while waiting in a tree stand. The bag may be removed from the stand after each use or it may be collapsed and tied to the stand as shown in FIG. 2 for transportation and storage with the stand. The foldable frame permits the noiseless opening and closing of the bag, which is essential to successful hunting.

The bag provides a useful, noiseless, lightweight, container that is useful as a hunting accessory that greatly increases the amount of storage space available to hunters to store equipment and food that is desirable during the long periods spent in tree stands.

While the present invention of a gear pocket has been disclosed as useful in connection with hunting tree stands, it will be apparent that the gear pocket is also useful to sportsmen other than hunters and to outdoor enthusiasts in general. For example, the gear pocket of the present invention is attachable to boats for use by fishermen or attachable to land vehicles used by hunters and outdoor enthusiasts such as photographers. Additional uses of the present invention is by outdoor enthusiasts such as by attaching the gear bag to outdoor furniture for use at picnics and by spectators at sporting events or attaching the gear bag to a wheelchair for use indoors or outdoors. Such additional uses of the gear pocket are intended to be within the scope of the invention.

Although the present invention has been described with respect to the preferred embodiment, changes and modifications involving other means of accomplishing the objectives may be apparent to those skilled in the art without departing from the full intended scope of the invention as set forth in the following claims, and such changes and modifications are to be considered within the full intended scope of the invention.

We claim:

1. A hunter's gear bag for the temporary containment and accessibility of items useful to a hunter positioned in a tree stand and with the capability of being pivoted alongside the tree stand and secured thereto in a folded-up condition for the unobstructed transport of the tree stand, comprising:

(a) a center panel and two end panels sewn together to form a pocket having four sides with top edges that form a top opening;

(b) a frame having members that are pivotally connected, said frame being pivotable between an open position in which said members have a rectangular shape and a collapsed position in which said members have a substantially aligned shape;

(c) means connecting said frame to the top opening of said pocket, whereby when said frame is pivoted to a rectangular shape said pocket is open and when said frame is pivoted to a collapsed condition said pocket is closed; and (d) means for removably attaching said frame to a tree stand.

2. A hunter's gear bag as in claim 1 in which said center panel and two end panels comprise water resistant camouflage fabric.

3. A hunter's gear bag as in claim 1 in which the means connecting said frame to said pocket comprise a sleeve formed at the top edge of each of said four sides, said frame has four members, and a frame member is positioned in at least three of said sleeves.

4. A hunter's gear bag as in claim 1 in which said frame comprises four elongated members, each said member being pivotally connected at its two ends to two adjacent members; the means connecting said frame to said pocket comprises a sleeve at the top edge of each of said four sides; and a frame member is positioned in at least three of said sleeves.

5. A hunter's gear bag as in claim 1 in which the means for removably attaching said bag to a tree stand comprises a mounting bracket that is a member of said frame.

6. A hunter's gear bag as in claim 1 in which the frame comprises three spring steel members and a mounting bracket; the means connecting the frame to said pocket comprises a sleeve at the top edge of each of said four sides; the means for removably attaching said bag to a tree stand comprises said mounting bracket; and in which each said spring steel member is positioned within a sleeve.

7. A hunter's gear bag as in claim 1 further comprising means for attaching said frame and pocket to a tree stand when said frame and pocket are in a collapsed and folded condition.

8. A hunter's gear bag for holding items useful to a hunter positioned in a tree stand, comprising:

(a) a center panel and two end panels joined together to form a pocket having four sides with top edges that form a top opening, said top opening having an open position and a closed position;

(b) a sleeve formed at the top edge of each of said four sides;

(c) a frame having four members that are pivotally connected at their ends, said frame being pivotable between an open position in which said members have a rectangular shape and a collapsed position in which said members are substantially aligned;

(d) at least three of said frame members being positioned in said sleeves, whereby when said frame pivots between said open position and said collapsed position, said top opening of said pocket will move between an open position and a closed position; and (e) means for removably attaching said frame to a tree stand.

9. A hunter's gear bag as in claim 8 in which three of said frame members are made of spring steel and one frame member is a mounting bracket; and the means for removably attaching said bag to a tree stand comprises said mounting bracket.

10. A hunter's gear bag as in claim 8 in which the means for removably attaching said bag to a tree stand comprises a flat mounting bracket that is one of said frame members.

11. A hunter's gear bag as in claim 8 in which the means for removably attaching said bag to a tree stand comprises an angle mounting bracket that is one of said frame members.

12. A hunter's gear bag as in claim 8 further comprising means for attaching said frame and pocket to a tree stand when said frame and pocket are in a collapsed and folded condition.

13. A hunter's gear bag as in claim 8 in which the center panel and two end panels comprise water resistant, camouflage fabric.

* * * * *